May 15, 1962     T. E. DE VINEY     3,035,215
POSITION CONTROL SERVOSYSTEM
Filed June 21, 1960
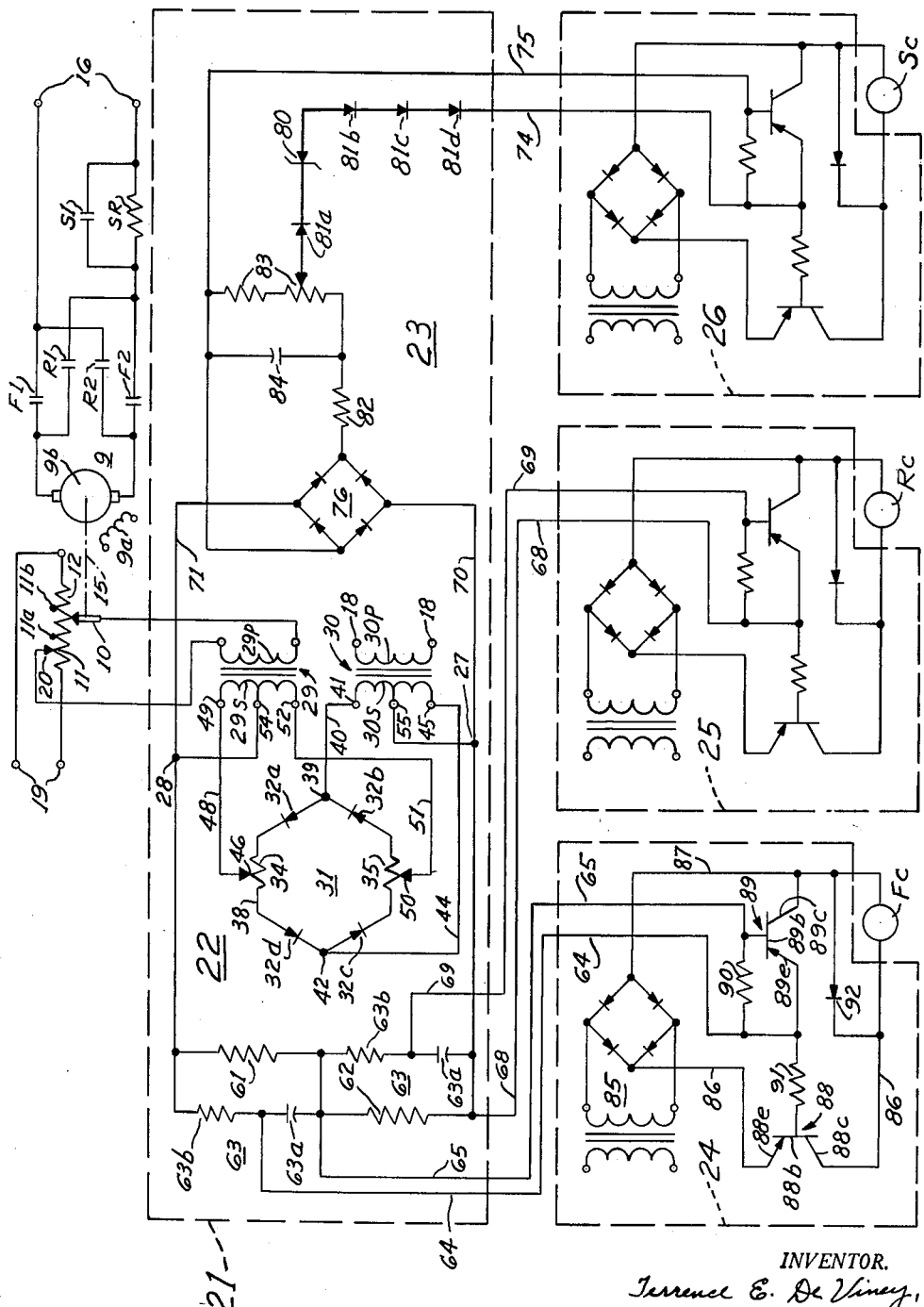
INVENTOR.
Terrence E. De Viney,
BY
John H. Leonard,
his ATTORNEY.

United States Patent Office 3,035,215
Patented May 15, 1962

3,035,215
POSITION CONTROL SERVOSYSTEM
Terrence E. De Viney, Cleveland, Ohio, assignor to Square D Company, Park Ridge, Ill., a corporation of Michigan
Filed June 21, 1960, Ser. No. 37,622
7 Claims. (Cl. 318—28)

This invention relates to a positioning system, and more particularly to an improved positioning system which reduces the speed of a driven member at a predetermined slow-down position as the member approaches a preselected null position and then stops the member when it reaches the null position.

Although having other uses, the present invention is particularly useful for positioning the rolls of a metal rolling mill wherein a direct current motor is used to drive a screw-down mechanism for moving an upper roll toward and away from a lower roll, selectively, to position the rolls at desired spacings. Demands for increased output from such rolling mills have made it necessary to provide for faster roll settings by increasing the speed of the screw-down drive so that it will operate rapidly to bring the rolls to a position near the desired correct spacing in a very short time and then operate more slowly to bring the rolls exactly to the desired spacing with little or no over-travel. Prior screw-down control systems operate more slowly than desired or use space-consuming magnetic amplifiers or delicate and easily broken electronic tubes.

The present invention dispenses with the use of electronic tubes and magnetic amplifiers by using a circuit means including a ring demodulator to provide a direct voltage error signal responsive to the position of the movable member relative to the selected null position. The error signal has a polarity dependent upon the direction required to move the movable member toward the preselected null position, and has a magnitude proportional to the distance between the movable member and the preselected null position. This error signal controls transistorized relay circuits so that forward and reverse contactors are responsive to the polarity of the signal and a slow-down contactor is responsive to its magnitude.

An object of the present invention is to provide improved circuitry which causes a control system to anticipate a stopping operation of a controlled device by reducing its speed of operation immediately prior to its reaching a desired position.

Another object of the present invention is to provide a positioning system in which a circuit means including a ring demodulator supplies a direct voltage error signal of alternate polarity and variable magnitude to perform control functions.

Another object of the present invention is to provide a transistorized positioning control system which has a fast response and is accurate and reliable in operation.

Other objects and advantages of the present invention will be had from the following description wherein reference is made to the drawings, in which:

The single FIGURE is a wiring diagram illustrating the invention.

The drawing includes certain electromagnetically operated devices in which the coils are represented by circles and the contacts operated thereby are represented by parallel lines. The contacts and their operating coils are identified in the drawing by a combination of letters and numbers with letters used as reference characters for the operating coils while their respective contacts are identified by the same letters as their complementary coils plus a number suffix. It is further noted that where convenient, the letters used as reference characters for contactor coils and their contacts are to some extent an abbreviation of their function in the system.

The drawing illustrates a control system for controlling the operation of a variable speed electric motor 9 driving a driven member 10 toward preselected position 11 of a number of possible preselected positions 11a, 11b, etc., along a path defined by a voltage divider resistor 12 and then stopping the member 10 when it reaches the preselected position 11. The motor 9 is energized from a source of power indicated at 16 and is operatively connected to the member 10 by a suitable connecting means 15, indicated by a broken line, to move the member 10 along the path defined by the resistor 12 at various speeds in the proper direction toward the preselected position 11 which initially may be on either side of the member 10, selectively. The motor 9 and its connecting means 15 may be a part of a screw-down mechanism (not shown) for positioning the rolls of a rolling mill.

While the motor 9, as shown, is a direct current motor having a shunt field 9a and an armature 9b, it may also have a series field (not shown). Control of the motor for forward direction of operation is effected by closure of normally open contacts F1 and F2 of an electromagnetic contactor having an operating coil Fc and, for reverse direction of operation, by closure of normally open contacts R1 and R2 of an electromagnetic contactor having an operating coil Rc. Inter-connected in series with the armature 9b is a slow-down resistor SR shunted by normally open contacts S1 of an electromagnetic contactor having an operating coil Sc.

In the disclosed embodiment, the position of the movable roll with reference to its preselected position is indicated by the position of the driven member 10 with respect to the preselected position 11. To determine when the member 10 has reached a preselected position, such as the position 11, there is provided a substantially constant alternating voltage reference signal provided by a source indicated at 18 and an alternating voltage feed-back signal obtained from the resistor 12. The resistor 12 is of uniform ohmic value per unit length and is connected across a source of alternating voltage indicated at 19. The preselected position 11 is determined by an adjustable tap 20 which may be selectively positioned along the resistor 12 at any of the positions 11a, 11b, etc. The voltage signal appearing across the resistor 12 between the member 10 and the tap 20 is the instantaneous feed-back signal. This signal has a phase relationship of 0 degrees or 180 degrees with respect to the reference signal of the source 18, which phase relationship is selectively dependent on the position of the member 10 relative to position 11. The feed-back signal also has a magnitude proportional to the measured displacement of the member 10 from the position 11. A circuit section 21, including a comparison means 22 and a current cutoff circuit 23, controls energization of transistorized switching circuits 24, 25, and 26, as will be explained later. In the circuit 21, the reference and feed-back voltage signals are compared by a ring demodulator comparator 22 to provide a direct voltage error signal at its output terminals 27 and 28. The voltage of this error signal at the output terminals 27 and 28 has a resultant magnitude dependent on both the voltage of the source 18 and on the voltage of the feed-back signal derived from the resistor 12, and thus has a magnitude dependent on the distance of the member 10 from the position 11, and has a polarity dependent on the direction required to move the member 10 toward the position 11.

To compare the feed-back signal from the member 10 and the tap 20 with the reference signal from the source 18, the comparator 22 receives the feed-back signal through an input transformer 29 having a primary winding 29p and a secondary winding 29s. The reference signal from the source 18 is supplied through a transformer 30 having a primary winding 30p and a secondary winding 30s and is of the same phase and frequency as the voltage of the source 19.

The comparator 22 includes a ring demodulator 31 described in copending application Serial No. 863,021, filed on December 30, 1959, by me for a Position Indicator, and assigned to the same assignee as this application. As shown, it comprises four unidirectional conducting devices or rectifiers 32a, 32b, 32c, and 32d and two resistors 34 and 35 connected in a loop 38. The rectifiers 32a, 32b, 32c, and 32d are poled to pass current in the same direction around the loop 38. The rectifiers 32a and 32b are next adjacent each other, and the rectifiers 32c and 32d are next adjacent each other in similar fashion. The resistors 34 and 35 are interposed between the rectifiers 32a and 32d and the rectifiers 32b and 32c, respectively.

Between the rectifiers 32a and 32b is a junction 39 which is connected by a conductor 40 to a terminal 41 of the transformer secondary 30s; and, similarly, between the rectifiers 32c and 32d is a junction 42 which is connected by a conductor 44 to the other terminal 45 of the transformer secondary 30s. Intermediate the ends of the resistor 34 is a junction 46 which is connected by a conductor 48 to a terminal 49 of the transformer secondary 29s; and, similarly, intermediate the ends of the resistor 35 is a junction 50 which is connected by a conductor 51 to a terminal 52 of the transformer secondary 29s.

Center taps 54 and 55 of the respective transformer secondaries 29s and 30s are connected to the output terminals 27 and 28 of the comparator 22. The direct current error signal at the terminals 27 and 28 has a magnitude and a polarity dependent on the instantaneous position of the member 10 relative to the selected null position 11.

An advantage of the ring demodulator 31 is that the output voltage at the terminals 27 and 28 will not exceed the voltage at the terminals 41 and 45 regardless of the voltage at the terminals 49 and 52. This characteristic puts an upper limit on the voltage that can appear at the input to the switching circuits 24 and 25.

The transistorized switching circuit 24 is responsive to the error signal at the output terminals 27 and 28 and operative, when a signal of one polarity is present, to energize the coil Fc resulting in closure of the contacts F1 and F2 and consequent operation of the motor 9 to move the member 10 in one direction toward the position 11. The transistorized switching circuit 25 is responsive to the error signal at the output terminals 27 and 28 and operative, when a signal of opposite polarity is present, to energize the coil Rc resulting in closure of the contacts R1 and R2 and consequent operation of the motor 9 to move the member 10 in the opposite direction toward the position 11. The transistorized slow-down switching circuit 26 is responsive to the error signal of either polarity at the output terminals 27 and 28 and operative to energize or deenergize the coil Sc selectively causing opening or closure of the contacts S1 thereby to control the speed of the motor 9 as it drives the member 10 toward the position 11. The speed is reduced when the member 10 is a predetermined distance from position 11, as will be explained.

The output voltage appearing across the output terminals 27 and 28 of the comparator 22 is fed through two series connected load resistors 61 and 62 to effect control of the circuits 24 and 25. A pair of filter capacitor combinations 63, each including a capacitor 63a connected in series with a resistor 63b, may be connected in parallel with the resistors 61 and 62, respectively. The circuit 24 receives its operating voltage signal through a pair of input leads 64 and 65 connected to opposite sides, respectively, of the capacitor 63a which is in parallel with the resistor 61. The circuit 25 receives its operating voltage signal through a pair of input leads 68 and 69 connected to opposite sides, respectively, of the capacitor 63a which is in parallel with the resistor 62.

The circuit 26 receives its operating signal from comparator output terminals 27 and 28 by means of leads 70 and 71, the current cutoff circuit 23, and leads 74 and 75. The voltage signal of reversible polarity appearing at the terminals 27 and 28 is changed to one of uniform polarity by the bridge rectifier 76. The direct current output of the bridge rectifier 76 is further modified by the diodes 80, 81a, 81b, 81c, and 81d included in the current cutoff circuit 23 to determine the slow-down point. Diode 80, as shown in the present embodiment of the invention, is operative as a Zener diode to permit current to pass in the proper direction only when the voltage impressed across it exceeds a value characteristic of the particular diode used. The other diodes 81a, 81b, 81c, and 81d are operative to further define the voltage value at which current will begin to flow. The output of the rectifier 76 is supplied through a series resistor 82 to a potentiometer 83 shunted by a filter capacitor 84. The potentiometer 83 provides additional adjustment of this voltage. The cutoff circuit 23 operates, then, at a selected voltage value to cut off the flow of current to slow-down circuit 26. This value is reached when the member 10 reaches a predetermined position with respect to the preselected position 11. It is to be understood that any particular combination of diodes operative to give the desired cutoff voltage may be used.

Switching circuits 24, 25, and 26 are similar in circuitry and operation. Therefore, only circuit 24, typical of all three, will be described.

In switching circuit 24, direct current for energizing coil Fc is provided by a direct current source illustrated in this instance as a bridge rectifier and transformer combination 85. The coil Fc is connected to the rectifier and transformer 85 by conductors 86 and 87. Interposed in the conductor 86 is a switching transistor 88 having its emitter 88e and collector 88c in series with the coil Fc, and its base 88b interconnected with an emitter 89e of an amplifying transistor 89. The collector 89c of the transistor 89 is connected to the conductor 87, and the base 89b of the transistor 89 is connected to the lead 65 while the lead 64 is connected to the emitter 89e of the transistor 89. Also connected between base 89b and the emitter 89e is a resistor 90, and, connected between the base 88b and the emitter 89e is a resistor 91. The coil Fc is shunted by a rectifier 92.

The control system operates as follows: Upon selection of a desired null position 11, the comparator 22 compares the voltage between the member 10 and the tap 20 at position 11 with the voltage from the source 18 and provides an error signal voltage which appears at terminals 27 and 28, at load resistors 61 and 62, and across the bridge rectifier 76. The direction of displacement of the member 10 relative to position 11 determines whether the circuit 24 or 25 will energize its respective contactor operating coil to cause its associated contacts to operate and thus energize the motor 9 to rotate in the correct direction to move the member 10 toward the position 11. Should forward rotation of the motor 9 be required, the voltage across the resistor 61 is of the correct polarity to energize the circuit 24 causing energization of the coil Fc and consequent closure of the forward contacts F1 and F2. The signal appearing at leads 64 and 65 is impressed across the resistor 90 and is of the correct polarity to be amplified by the transistor 89 and to cause conduction through the emitter 88e and the collector 88c of the transistor 88. When the transistor 88 conducts, the coil Fc is energized to close the contacts F1 and F2 energizing the motor 9 to cause it to rotate in the forward direction. The polarity of the voltage across the resistor 62 at this time is such that the circuit 25 is not energized. If the member 10 is on the opposite side of position 11 or is moved beyond the position 11, the signal output from the comparator 22 causes circuit 25 to respond in like manner as circuit 24 to the voltage across resistor 62 by means of leads 68 and 69 and control the energization of coil Rc which causes closure of the contacts R1 and R2 to energize the motor 9 for rotation in the reverse direction.

Slow-down circuit 26 responds to the voltage output of bridge rectifier 76 as controlled by current cutoff circuit 23 through leads 74 and 75 to control the energization of coil Sc and operate contacts S1. If the distance between member 10 and position 11 requires that the motor 9 operate at a fast rate of speed, the voltage at the cutoff circuit 23 is adequate to energize the slow-down circuit 26 and thereby to cause the coil Sc to close the contact S1 thereby to bypass the resistor SR. However, when the member 10 reaches a predetermined distance from the position 11, the voltage signal between the member 10 and the tap 20 of position 11 is reduced so that the voltage at the output terminals 27 and 28 of the comparator 22 and impressed across the cutoff circuit 23, is below that value which permits flow of current through the diodes 80, 81a, 81d, 81c, and 81b. Deenergization of the coil Sc of circuit 26 and consequent opening of contact S1 is thus effected thereby inserting resistor SR in series with the armature 9b to cause the motor 9 to slow down.

Having thus described my invention, I claim:

1. A control system for positioning a member at desired positions along a path, said system comprising a variable speed motor capable of moving said member along said path at various speeds in either direction toward said positions on said path, selectively, an energizing circuit for said motor, an alternating voltage reference signal, means providing an alternating voltage feed-back signal of a magnitude dependent on the distance of said member from a preselected one of said positions and displaced in phase relative to the phase of said reference signal an amount dependent on the direction of movement required to move said member toward said preselected one of said positions, comparison means comparing said feed-back signal with said reference signal and providing a direct voltage error signal of a magnitude dependent on said distance and of a polarity dependent on said required direction of movement, control means responsive to the polarity of said error signal for controlling said energizing circuit to cause said motor to move said member in said required direction, and said comparison means comprising a group of four unidirectional conducting devices arranged in a closed loop and poled to pass current in the same direction about said loop.

2. A control system according to claim 1 and including additionally a second control means responsive to the magnitude of said error signal for controlling said energizing circuit to vary the speed of the motor in accordance with said distance between said member and said preselected one of said positions.

3. The combination of claim 1 characterized in that said comparison means includes two resistors each of which are interposed between a first and second rectifier of two pairs of said rectifiers, respectively, and arranged in interconnecting loop fashion.

4. A control system comprising a resistor having a plurality of contact segments and a motor driven contact member engageable with said segments in sequence, means whereby any one of said segments may be selected to cooperate with said contact member to provide a feed-back signal, switch means operable to start and stop said member, comparison means for producing a direct voltage error signal having a magnitude proportional to the number of segments between said member and a preselected one of said segments and having a polarity dependent upon the direction required to move said member toward said preselected segment, said comparison means including two pairs of unidirectional conducting devices arranged in an electrically connected loop having a first and second resistor interposed between said devices of both of said pairs, respectively, which resistors each have a terminal intermediate the ends thereof, said loop having also a third and fourth terminal interposed between the remaining two junctions of said unidirectional devices, respectively, one pair of said terminals being situated diametrically opposite one another in said loop and being electrically connected to said feed-back signal derived from said resistor and the other pair of said terminals being electrically connected to a reference signal, means for receiving said error signal from said comparison means, a first and second circuit means responsive to the polarity of said error signal when said error signal is present for rendering said switch means operative to move said member in said direction toward said preselected segment, contactor means operative to control the speed of said member, and a third circuit means including means responsive to the magnitude of voltage of said error signal for rendering said contactor means operative to reduce the speed of said member prior to said member reaching said preselected segment.

5. A control system for positioning a member at desired positions along a path, said system comprising a variable speed motor capable of moving said member along said path at various speeds in either direction toward said positions on said path, selectively, an energizing circuit for said motor, an alternating voltage reference signal, means providing an alternating voltage feed-back signal of a magnitude dependent on the distance of said member from a preselected one of said positions and displaced in phase relative to the phase of said reference signal an amount dependent on the direction of movement required to move said member toward said preselected one of said positions, comparison means comparing said feed-back signal with said reference signal and providing a direct voltage error signal of a magnitude dependent on said distance and of a polarity dependent on said required direction of movement, control means responsive to the polarity of said error signal for controlling said energizing circuit to cause said motor to move said member in said required direction, a second control means responsive to the magnitude of said error signal for controlling said energizing circuit to vary the speed of the motor in accordance with said distance between said member and said preselected one of said positions, and current cutoff means for restricting current from said second control means when the voltage of said error signal decreases below a predetermined value, said cutoff means comprising a unidirectional current conducting means operative to permit current flow only when the voltage impressed across said unidirectional current conducting means exceeds said predetermined value.

6. The combination of claim 5 characterized in that said unidirectional current conducting means includes a plurality of individual unidirectional current conducting devices.

7. The combination of claim 6 characterized in that at least one of said plurality of individual unidirectional current conducting devices is reversed in polarity with respect to another of said devices.

References Cited in the file of this patent

UNITED STATES PATENTS

| | | |
|---|---|---|
| 2,774,021 | Ehret | Dec. 11, 1956 |
| 2,837,662 | Ehret | June 3, 1958 |
| 2,887,507 | La Hue et al. | May 19, 1959 |
| 2,889,507 | Kennedy et al. | June 2, 1959 |
| 2,905,877 | Ciscel | Sept. 22, 1959 |
| 2,922,930 | Shaeve | Jan. 26, 1960 |